US012060206B2

(12) United States Patent
Liu et al.

(10) Patent No.: US 12,060,206 B2
(45) Date of Patent: Aug. 13, 2024

(54) ANTI-COUNTERFEITING STRUCTURE AND PACKAGING BOX HAVING THE SAME

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Hong Liu, Zhengzhou (CN); Fu-Pin Hsieh, New Taipei (TW); Zhen-Hai Mei, Zhengzhou (CN); Fa-Peng Sun, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 491 days.

(21) Appl. No.: 17/552,885

(22) Filed: Dec. 16, 2021

(65) Prior Publication Data

US 2022/0242632 A1 Aug. 4, 2022

(30) Foreign Application Priority Data

Feb. 3, 2021 (CN) ......................... 202120315178.0

(51) Int. Cl.
*G08B 21/18* (2006.01)
*B65D 55/02* (2006.01)

(52) U.S. Cl.
CPC ......... *B65D 55/026* (2013.01); *B65D 55/028* (2013.01); *B65D 2203/12* (2013.01); *B65D 2401/00* (2020.05); *G08B 21/18* (2013.01)

(58) Field of Classification Search
CPC ................ B65D 55/026; B65D 55/028; B65D 2203/12; B65D 2401/00; G08B 21/18; B42D 25/30; G06F 21/86; E05B 73/0023
USPC ........................ 340/568.1, 571, 572.1, 572.8
See application file for complete search history.

(56) References Cited

U.S. PATENT DOCUMENTS

| | | | | |
|---|---|---|---|---|
| 11,463,245 | B2 * | 10/2022 | Adari | G16Y 30/10 |
| 2022/0411148 | A1 * | 12/2022 | Rajagopal | B65D 55/145 |
| 2023/0008277 | A1 * | 1/2023 | Gloor | B65D 51/002 |

* cited by examiner

*Primary Examiner* — Mollie Impink
(74) *Attorney, Agent, or Firm* — ScienBiziP, P.C.

(57) ABSTRACT

An anti-counterfeiting structure to prevent tampering or replacement of the authenticated product of a packaging box includes a fixing member, a connecting member, a first mounting member, a second mounting member, and an anti-counterfeiting member. The connecting member connected to the fixing member defines a first receiving groove. The first mounting member is disposed in the first receiving groove and defines a second receiving groove. The anti-counterfeiting member in the second receiving groove includes an electronic screen and a battery disposed on the electronic screen. The first mounting member can be readily moved along a first direction away from the connecting member, driving the electronic screen along the first direction and thereby separating the battery from the electronic screen, causing cancellation of the structure and the visible authenticity of the product within the packaging box.

18 Claims, 9 Drawing Sheets

ANTI-COUNTERFEITING STRUCTURE AND PACKAGING BOX HAVING THE SAME

FIELD

The subject matter herein generally relates to security of property, and more particularly, to an anti-counterfeiting structure and a packaging box having the anti-counterfeiting structure.

BACKGROUND

High-end products, such as red wine, tea, traditional Chinese medicine, or jewelry, is packaged in boxes. Such a box includes a lower cover and an upper cover that can be brought together to enclose and protect the product. An anti-counterfeiting label can be fixed across the joining surface between the upper and the lower covers, which can guard against tampering or replacement of the product inside of the box, and authenticity of the product can be confirmed by the anti-counterfeiting label being intact before opening the box.

However, the anti-counterfeiting label can be easily to be torn off from the box, and then the authentic product in the packaging box might be replaced with fake product. Furthermore, a verification code on the anti-counterfeiting label is in plain sight and can be easily copied.

BRIEF DESCRIPTION OF THE DRAWINGS

Implementations of the present technology will now be described, by way of embodiment, with reference to the attached figures.

DETAILED DESCRIPTION

Figure 1:
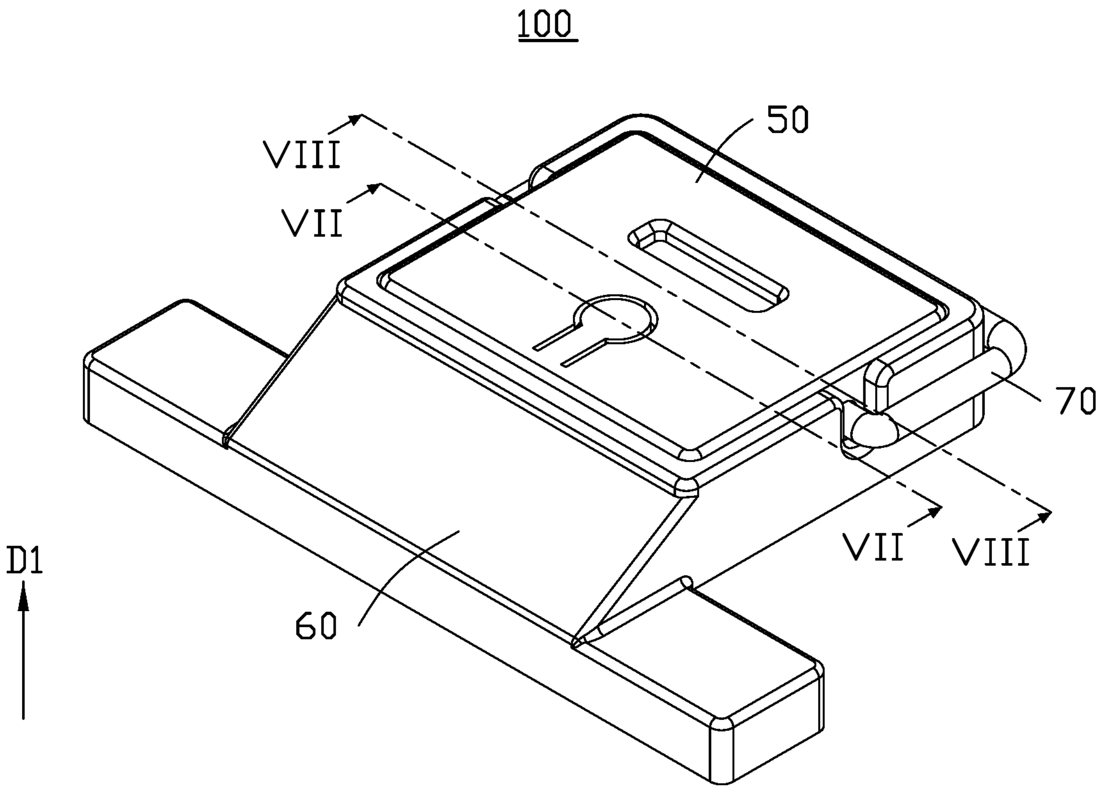
FIG. 1 is a diagrammatic view of an embodiment of an anti-counterfeiting structure according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term “comprising,” when utilized, means “including, but not necessarily limited to”; it specifically indicates open-ended inclusion or membership in the so-described combination, group, series, and the like.

Figure 2:
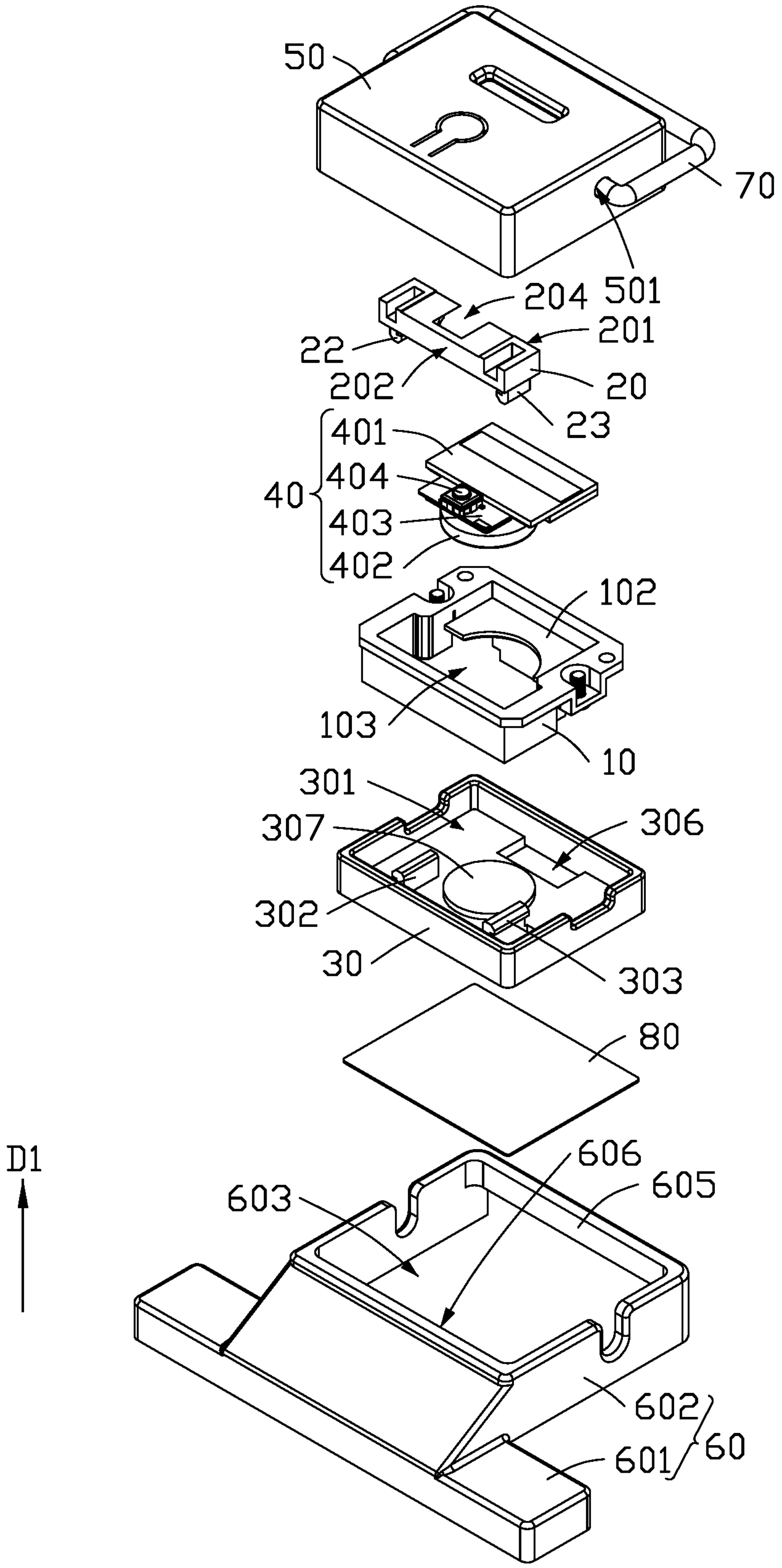
FIG. 2 is an exploded view of the anti-counterfeiting structure of FIG. 1.
Figure 3:
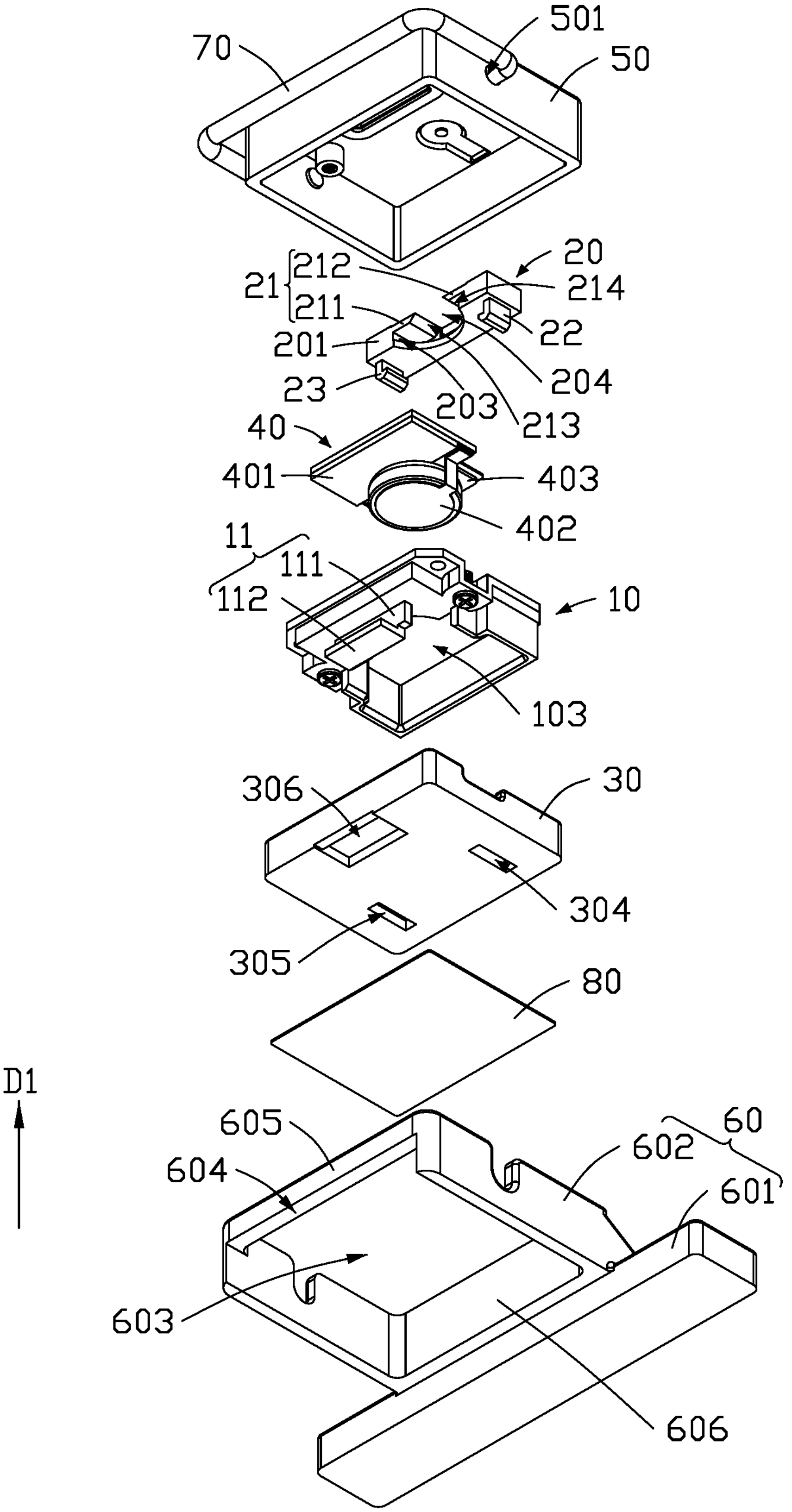
FIG. 3 is similar to FIG. 2, but showing the anti-counterfeiting structure from another angle.

Referring to FIGS. 1 to 3, an embodiment of an anti-counterfeiting structure 100 is provided, which includes a fixing member 60, a connecting member 30, a first mounting member 10, a second mounting member 20, an anti-counterfeiting member 40, and a cover 50. The connecting member 30 is movably connected to the fixing member 60. The connecting member 30 defines a first receiving groove 301. The first mounting member 10 is movably disposed in the first receiving groove 301. The first mounting member 10 defines a second receiving groove 103 passing through the first mounting member 10. The second mounting member 20 is disposed in the second receiving groove 103 and fixed to the connecting member 30. The anti-counterfeiting member 40 is also disposed in the second receiving groove 103. The second mounting member 20 and the anti-counterfeiting member 40 are arranged side by side in the second receiving groove 103. The cover 50 covers the connecting member 30, and is fixed to the first mounting member 10.

Referring to FIGS. 2 and 3, the anti-counterfeiting member 40 includes an electronic screen 401 and a battery 402 electrically connected to the electronic screen 401. The electronic screen 401 can display a code or label of authenticity which includes an identification information of a product. The battery 402 is disposed on the electronic screen 401. A portion of the battery 402 protrudes out from a side of the electronic screen 401. In an embodiment, the electronic screen 401 and the battery 402 can be connected to each other by laser welding or electric welding. The battery 402 can be a button battery.

The anti-counterfeiting member 40 also includes a circuit board 403 and a switch 404. The circuit board 403, which can store the identification information, is disposed between the electronic screen 401 and the battery 402. A portion of the circuit board 403 protrudes from the electronic screen 401 towards the second mounting member 20. In another embodiment, the circuit board 403 may also be integrated into the electronic screen 401. When the anti-counterfeiting member 40 is damaged by impact or interfered with, the identification information stored in the circuit board 403 is deleted and cannot be recovered. The anti-counterfeiting member 40 is not reusable.

The switch 404 is disposed on the circuit board 403. The electronic screen 401 and the switch 404 are on the same surface of the circuit board 403. The switch 404 is used to control the battery 402 to electrically connect to or disconnect from the electronic screen 401. Thus, an electric energy of the battery 402 can be saved. In other embodiments, the switch 404 may be omitted. The circuit board 403 can directly control the battery 402 to supply or shut off power to the electronic screen 401.

Figure 4:
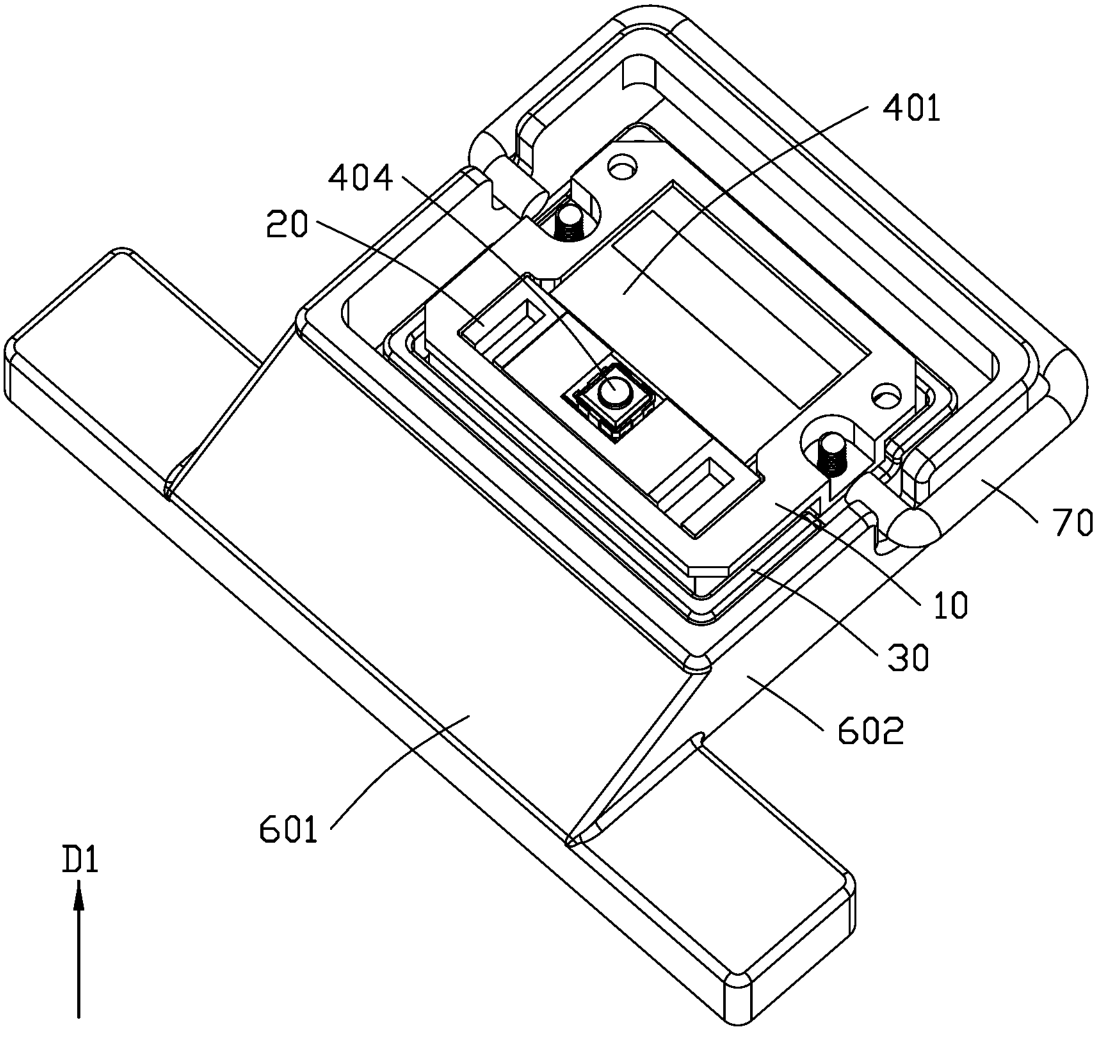
FIG. 4 is a diagrammatic view of the anti-counterfeiting structure of FIG. 1, with a cover removed.
Figure 5:
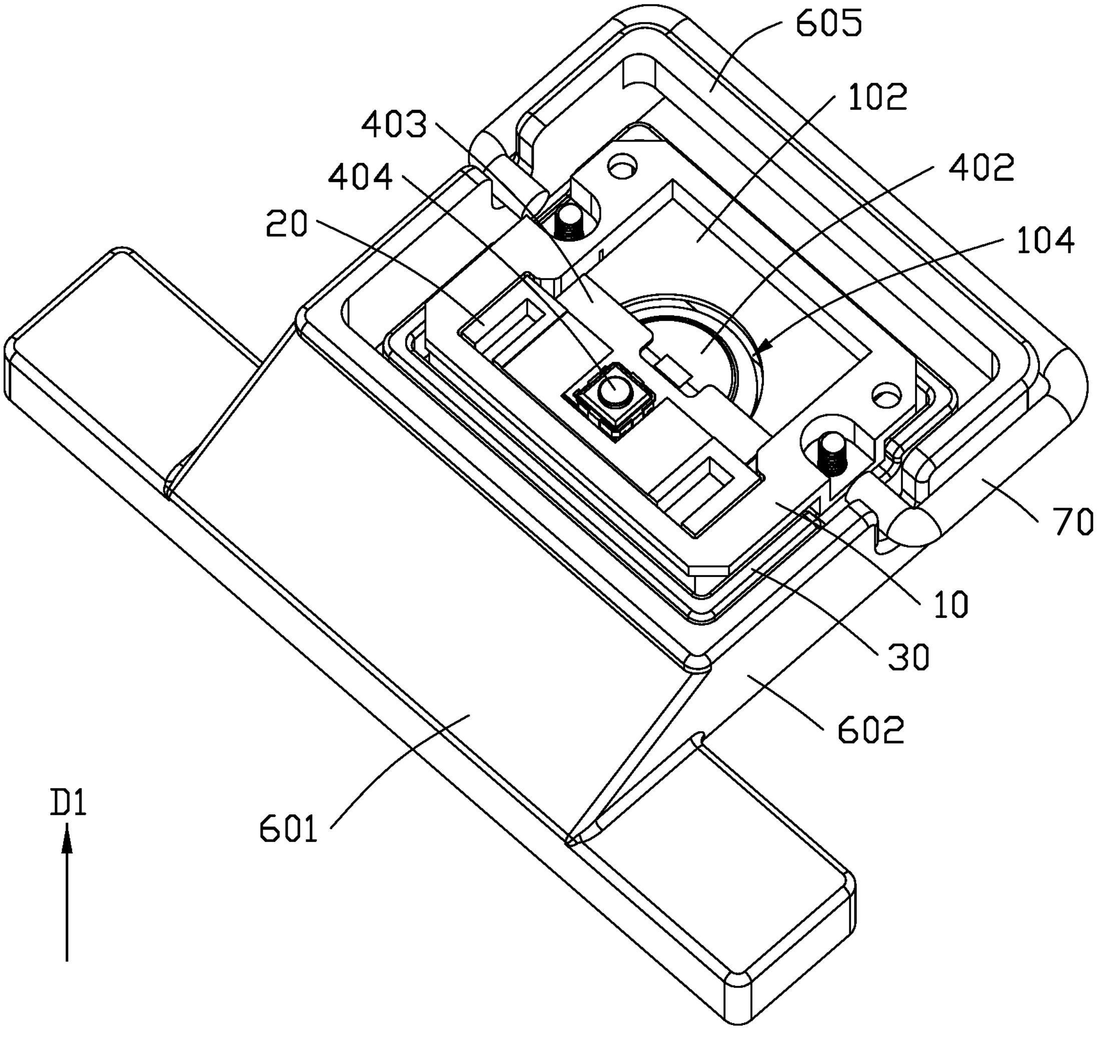
FIG. 5 is a diagrammatic view of the anti-counterfeiting structure of FIG. 4, with an electronic screen removed.

Referring to FIGS. 2, 4 and 5, an inner wall of the second receiving groove 103 of the first mounting member 10 extends inward to form a supporting portion 102. In an embodiment, the supporting portion 102 can be a supporting plate. The electronic screen 401 is disposed on the supporting portion 102. In other embodiments, the supporting portion 102 may also be a rod or a mesh.

Referring to FIGS. 2 and 3, the second mounting member 20 includes a first sidewall 201 facing the supporting portion 102 and a second sidewall 202 opposite to the first sidewall 201. Also referring to FIG. 7, a portion of the first sidewall 201 aligned with the supporting portion 102 is recessed towards the second sidewall 202 to form a recess surface. An edge of the supporting portion 102 facing the first sidewall 201 is also recessed to form another recess surface. The two recess surfaces cooperatively define a third receiving groove 104. The battery 402 is disposed in the third receiving groove 104. In an embodiment, the battery 402 is circular. Each of the two recesses is arced, to match the outline of the battery 402.

The first sidewall 201 is further recessed towards the second sidewall 202 to form a fourth receiving groove 203, which communicates with the third receiving groove 104. The fourth receiving groove 203 is disposed above the battery 402. The portion of the circuit board 403 protruding from the electronic screen 401 is disposed in the fourth receiving groove 203.

Referring to FIGS. 2 to 4, the second mounting member 20 includes a limiting portion 21 extending from the inner wall of the fourth receiving groove 203. The limiting portion 21 includes a first limiting plate 211 and a second limiting plate 212 opposite to each other. The first limiting plate 211 and the second limiting plate 212 are disposed on a top surface of the circuit board 403 facing the electronic screen 401. Also referring to FIG. 7, the orthogonal projection of adjacent ends of the first limiting plate 211 and the second limiting plate 212 onto the third receiving groove 104 is into the battery 402. A vertical direction from the supporting portion 102 to the electronic screen 401 is defined as a first direction D1, and the first limiting plate 211 and the second limiting plate 212 limit the movement of the battery 402 along the first direction D1. Thus, the adjacent ends of the first limiting plate 211 and the second limiting plate 212 prevent the battery 402 from separating from the second mounting member 20. That is, the battery 402 is prevented from separating from the electronic screen 401. Similarly, the orthogonal projection of two adjacent ends of the first limiting plate 211 and the second limiting plate 212 onto the fourth receiving groove 203 is into the circuit board 403. Thus, the adjacent ends of the first limiting plate 211 and the second limiting plate 212 also prevent movement of the circuit board 403 out of the fourth receiving groove 203.

Figure 7:
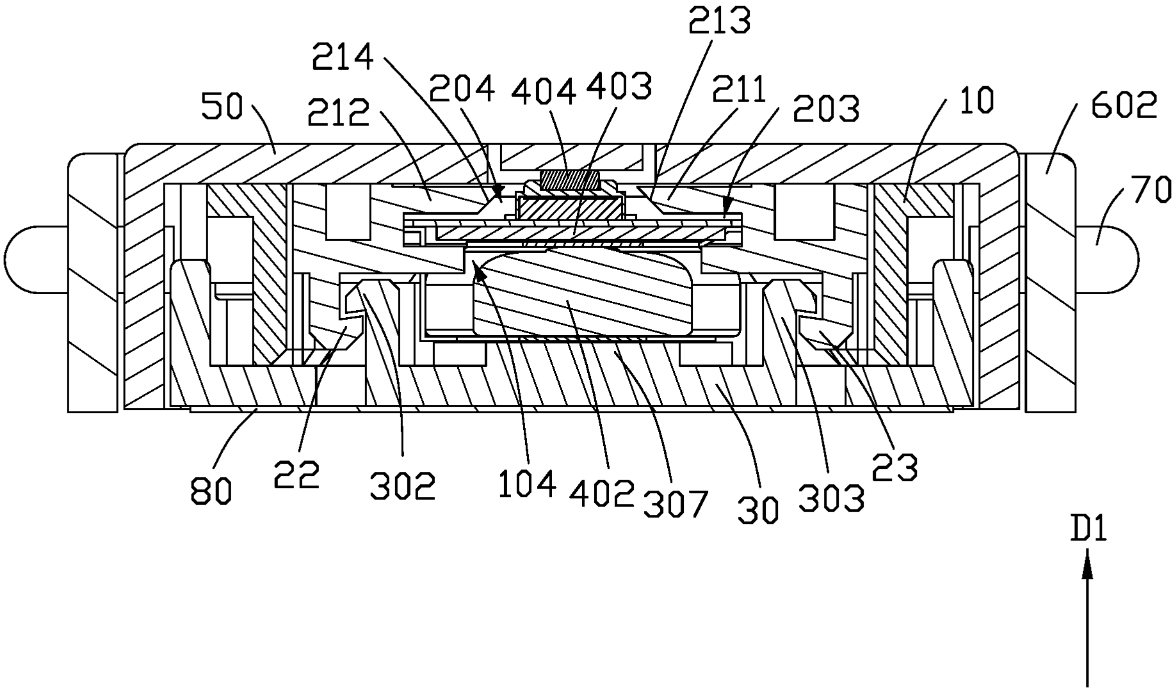
FIG. 7 is a cross-sectional view along VII-VII view line of FIG. 1.
Figure 8:
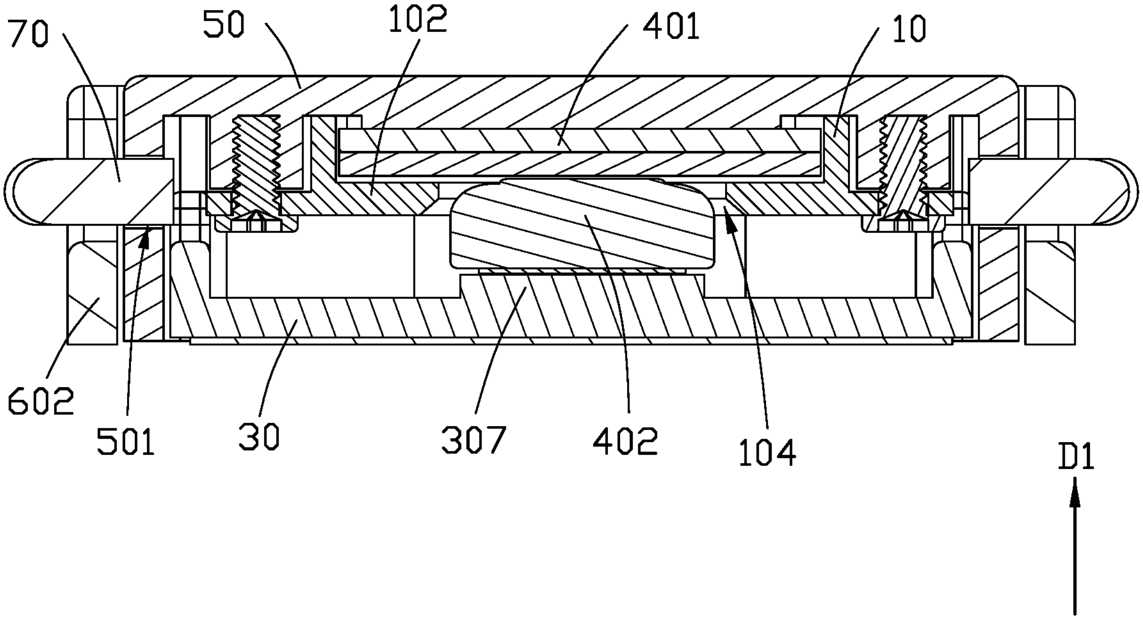
FIG. 8 is a cross-sectional view along VIII-VIII view line of FIG. 1.

Referring to FIGS. 2, 3 and 7, the adjacent ends of the first limiting plate 211 and the second limiting plate 212 define a fifth receiving groove 204 for receiving the switch 404. A surface of switch 404 away from circuit board 403 is higher than surfaces of the first limiting plate 211 and the second limiting plate 212 away from circuit board 403. Thus, switch 404 is accessible to a user to control the battery 402 to power on or power off the electronic screen 401.

Referring to FIGS. 3 and 7, the adjacent ends of the first limiting plate 211 and the second limiting plate 212 include a first inclined surface 213 and a second inclined surface 214 respectively. The first inclined surface 213 and the second inclined surface 214 are inclined relative to the circuit board 403. A width of the fifth receiving groove 204 decreases gradually along the first direction D1. As such, the switch 404 can be limited in movement in the fifth receiving groove 204.

Referring to FIGS. 2, 3, 6, and 7, the second mounting member 20 also includes a first buckle 22 and a second buckle 23. The first buckle 22 and the second buckle 23 are both disposed on a bottom surface of the second mounting member 20 facing the connecting member 30. The third receiving groove 104 is disposed between the first buckle 22 and the second buckle 23. The connecting member 30 includes a third buckle 302 and a fourth buckle 303. The third buckle 302 and the fourth buckle 303 are disposed at a bottom surface of the first receiving groove 301. The third buckle 302 and the first buckle 22 can be snapped together, and the fourth buckle 303 and the second buckle 23 can be snapped together. As such, the second mounting member 20 and the connecting member 30 are fixed together. When the first mounting member 10 moves along the first direction D1, the first mounting member 10 moves simultaneously, which also drives the electronic screen 401 to move. However, the battery 402 and the second mounting member 20 are fixed to the connecting member 30. Thus, the battery 402 is readily separated from the electronic screen 401, thus canceling the anti-counterfeiting member 40 and the authenticity it represents. The anti-counterfeiting structure 100 cannot function again.

Referring to FIG. 3, in an embodiment, the connecting member 30 further defines a first through hole 304 and a second through hole 305 passing through the bottom surface of the first receiving groove 301. The position of the first through hole 304 corresponds to the snap-together position of the first buckle 22 and the third buckle 302, which increases the space for snapping the first buckle 22 and the third buckle 302 together. Similarly, the position of the second through hole 305 corresponds to the snap-together position of the second buckle 23 and the fourth buckle 303.

Referring to FIGS. 2, 3 and 7, in an embodiment, the connecting member 30 includes a convex stage 307 at a bottom surface of the first receiving groove 301, and the convex state 307 corresponds to the battery 402. The convex stage 307 supports the battery 402, holding the battery 402 stable within the anti-counterfeiting structure 100 and improving the stability of the anti-counterfeiting member 40.

In an embodiment, the connecting member 30 also defines a limiting hole 306 passing through the bottom surface of the first receiving groove 301. The first mounting member 10 further includes a latching portion 11 on a bottom surface of the supporting portion 102 away from the electronic screen 401. The latching portion 11 includes a first plate 111 disposed on the supporting portion 102 and a second plate 112 connected to the first plate 111. The first support plate 111 is perpendicular to the second plate 112. The second plate 112 is disposed in the limiting hole 306. Thus, the first mounting member 10 and the connecting member 30 can be connected together more stably, reducing the shaking of the first mounting member 10 in the connecting member 30.

Figure 9:
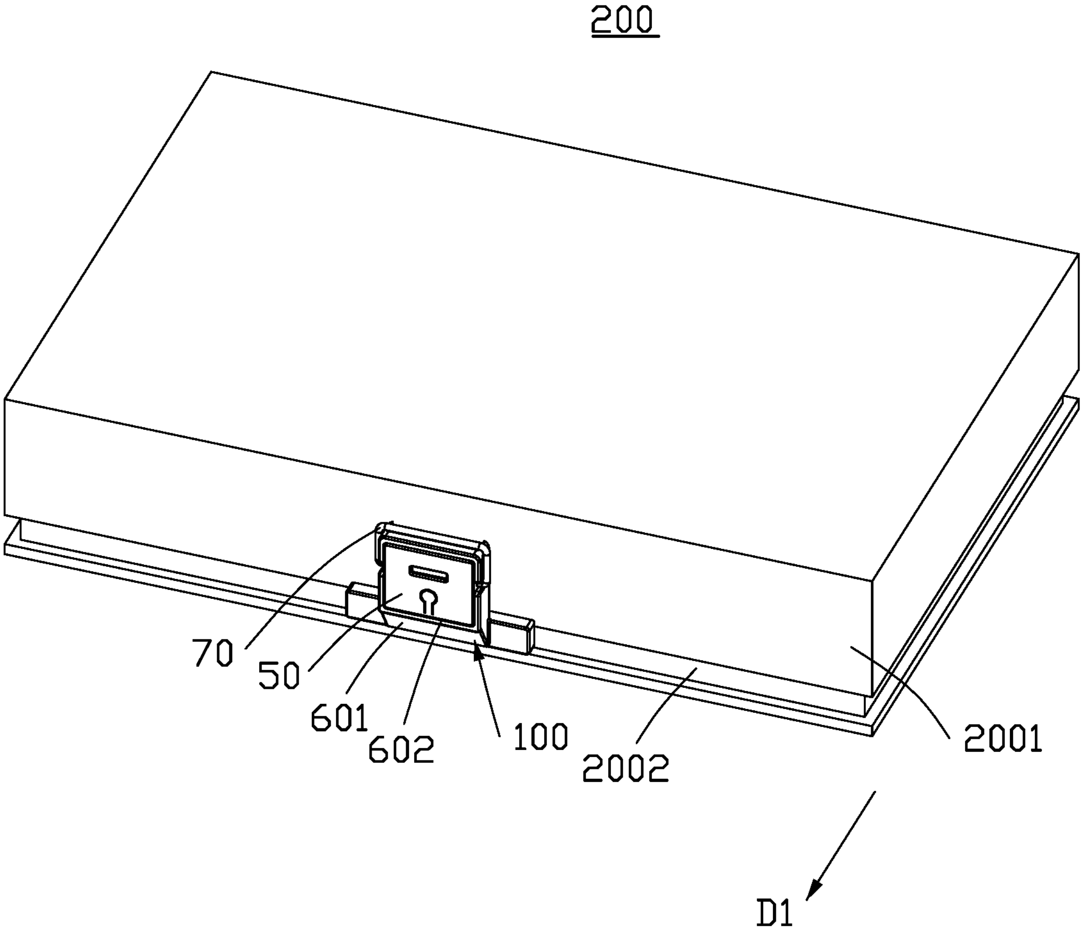
FIG. 9 is a diagrammatic view of an embodiment of a packaging box according to the present disclosure.

Referring to FIGS. 2, 3, 5 and 7, in an embodiment, an adhesive layer 80 is disposed at a bottom surface of connecting member 30, which bonds the anti-counterfeiting structure 100 to a packaging box 200 (shown in FIG. 9). The cover 50 covers a surface of the connecting member 30 away from the adhesive layer 80. The first mounting member 10, the second mounting member 20, and the anti-counterfeiting member 40 are disposed between the connecting member 30 and the cover 50, so that the security of the anti-counterfeiting structure 100 is further improved. In an embodiment, the cover 50 can be further fixed to the first mounting member 10, such as by screws. In order to facilitate the opening of the anti-counterfeiting structure 100, a pull ring 70 is disposed on the cover 50. Two installation holes 501 are defined on both sides of the cover 50. Two ends of the pull ring 70 are rotatably disposed in the two installation holes 501. As such, when the first mounting member 10 and connecting member 30 need to be separated from each other, the pull ring 70 can be pulled along the first direction D1, so that the cover 50 moves the first mounting member 10 and the electronic screen 401. Since the limiting portion 21 limits the movement of the battery 402, the battery 402 will separate from the electronic screen 401.

Figure 6:
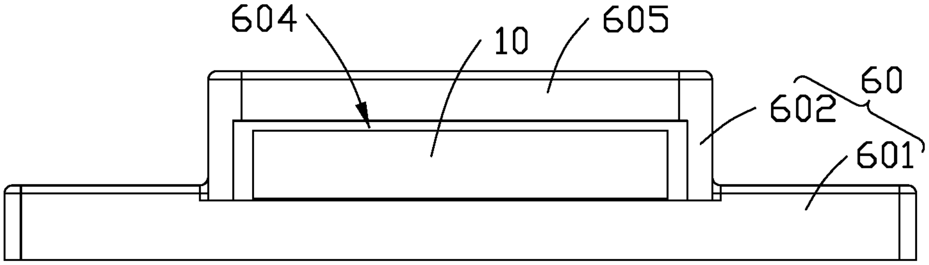
FIG. 6 is a side diagrammatic view of the anti-counterfeiting structure of FIG. 1.

Referring to FIGS. 2, 3 and 6, the fixing member 60 includes a first fixing portion 601 and a second fixing portion 602 connected to the first fixing portion 601. The second fixing portion 602 defines a first slot 603 and a second slot 604. The first slot 603 passes through the second fixing portion 602 along the first direction D1. The cover 50 and the connecting member 30 are movably disposed in the first slot 603.

The second fixing portion 602 includes a first side surface 605 and a second side surface 606 on both sides of the first slot 603. The second side surface 606 is disposed between the first side surface 605 and the first fixing portion 601. The first side surface 605 is recessed along the first direction D1 to form the second slot 604, and the second slot 604 communicates with the first slot 603. Along the first direction D1, a depth of the second slot 604 is greater than a thickness of the connecting member 30. In this embodiment, the thickness of the connecting member 30 is defined as a distance from the surface of the connecting member 30 away from the adhesive layer 80 to the surface of the connecting member 30 bonded to the adhesive layer 80.

Referring to FIG. 9, an embodiment of a packaging box 200 is also provided, which includes at least one anti-counterfeiting structure 100. The packaging box 200 further includes a first cover 2001 and a second cover 2002 that can be movably connected to the first cover 2001. In an embodiment, the first cover 2001 covers the second cover 2002, and the sidewalls of the first cover 2001 surround the sidewalls of the second cover 2002. In other embodiments, the first cover 2001 and the second cover 2002 may also be connected together rotatably. Each anti-counterfeiting structure 100 is fixed at the connecting portion of the first cover 2001 and the second cover 2002. In detail, the connecting member 30 is fixed on the first cover 2001 through the adhesive layer 80. The first fixing portion 601 is fixed on the second cover 2002 through another adhesive layer (not shown), while the second fixing portion 602 is not fixed on the first cover 2001.

Because the connecting member 30 is adhered to the first cover 2001 and the second mounting member 20 is fixed the connecting member 30, when the pull ring 70 is pulled along the first direction D1, the cover 50, the electronic screen 401, and the first mounting member 10 are driven to move together and separate from the packaging box 200. The battery 402 is retained in the third receiving groove 104 by the limiting portion 21, so that the battery 402 is separated from the electronic screen 401, and the anti-counterfeiting member 40, and its function, are canceled. At this time, the battery 402 is retained in the second mounting member 20. The second mounting member 20 and the connecting member 30 are fixed to the first cover 2001. The cover 50, the electronic screen 401, and the first mounting member 10 are separated from the packaging box 200.

Furthermore, when the first cover 2001 and the second cover 2002 need to be separated from each other, the depth of the second slot 604 being greater than the thickness of the connecting member 30 means that the connecting member 30 can be separated from the second fixing portion 602 through the second slot 604. As such, the first cover 2001 and the second cover 2002 are separated, and the packaging box 200 is opened.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. An anti-counterfeiting structure, comprising:

a fixing member;

a connecting member movably connected to the fixing member, the connecting member defining a first receiving groove;

a first mounting member movably disposed in the first receiving groove, the first mounting member defining a second receiving groove extending through the first mounting member, the first mounting member further comprising a supporting portion;

a second mounting member disposed in the second receiving groove and fixed to the connecting member; and an anti-counterfeiting member disposed in the second receiving groove, the anti-counterfeiting member comprising an electronic screen and a battery disposed on the electronic screen, the electronic screen disposed on the supporting portion, the battery being limited between the second mounting member and the connecting member;

wherein the first mounting member is adapted to move along a first direction away from the connecting member, thereby driving the electronic screen to move along the first direction, so that the electronic screen is separated from the battery.

2. The anti-counterfeiting structure of claim 1, wherein the supporting portion extends from an inner wall of the second receiving groove, a third receiving groove is defined between the supporting portion and the second mounting member, the battery is disposed in the third receiving groove.

3. The anti-counterfeiting structure of claim 2, wherein the fixing member comprises a first fixing portion and a second fixing portion connected to the first fixing portion, the second fixing portion defines a first slot and a second slot, the first slot extends through the second fixing portion along the first direction, the connecting member is movably disposed in the first slot;

the second fixing portion comprises a first side surface and a second side surface on both sides of the first slot, the second side surface is disposed between the first side surface and the first fixing portion, the first side surface is recessed along the first direction to form the second slot, the second slot communicates with the first slot, along the first direction, a depth of the second slot is greater than a thickness of the connecting member.

4. The anti-counterfeiting structure of claim 2, wherein the anti-counterfeiting member further comprises a circuit board between the electronic screen and the battery, a portion of the circuit board protrudes from the electronic screen towards the second mounting member;

the second mounting member comprises a first sidewall facing the electronic screen and a second sidewall opposite to the first sidewall, the first sidewall is recessed towards the second sidewall to form a fourth receiving groove communicating with the third receiving groove, the portion of the circuit board is disposed in the fourth receiving groove.

5. The anti-counterfeiting structure of claim 4, wherein the second mounting member comprises a limiting portion disposed in the fourth receiving groove, and the limiting portion is configured to limit a movement of the battery along the first direction.

6. The anti-counterfeiting structure of claim 5, wherein the anti-counterfeiting member further comprises a switch, the switch and the electronic screen are disposed on a same surface of the circuit board;

the limiting portion comprises a first limiting plate and a second limiting plate extending from two opposite walls of the fourth receiving groove, adjacent ends of the first limiting plate and the second limiting plate define a fifth receiving groove for receiving the switch.

7. The anti-counterfeiting structure of claim 1, further comprising a cover, wherein the cover covers the connecting member and is fixed to the first mounting member.

8. The anti-counterfeiting structure of claim 1, wherein the second mounting member further comprises a first buckle and a second buckle, the connecting member comprises a third buckle and a fourth buckle, the third buckle and the fourth buckle are disposed at a bottom surface of the first receiving groove, the third buckle and the first buckle are configured to be snapped together, and the fourth buckle and the second buckle are configured to be snapped together.

9. The anti-counterfeiting structure of claim 8, wherein the connecting member further defines a first through hole and a second through hole extending through the bottom surface of the first receiving groove, a position of the first through hole corresponds to a snap-together position of the first buckle and the third buckle, and a position of the second through hole corresponds to a snap-together position of the second buckle and the fourth buckle.

10. A packaging box, comprising:

a first cover;

a second cover movably connected to the first cover; and an anti-counterfeiting structure comprising:

a fixing member fixed on the second cover;

a connecting member fixed on the first cover and movably connected to the fixing member, the connecting member defining a first receiving groove;

a first mounting member movably disposed in the first receiving groove, the first mounting member defining a second receiving groove extending through the first mounting member, the first mounting member further comprising a supporting portion;

a second mounting member disposed in the second receiving groove and fixed to the connecting member; and an anti-counterfeiting member disposed in the second receiving groove, the anti-counterfeiting member comprising an electronic screen and a battery disposed on the electronic screen, the electronic screen disposed on the supporting portion, the battery being limited between the second mounting member and the connecting member;

wherein the first mounting member is adapted to move along a first direction away from the connecting member, thereby driving the electronic screen to move along the first direction, so that the electronic screen is separated from the battery.

11. The packaging box of claim 10, wherein the supporting portion extends from an inner wall of the second receiving groove, a third receiving groove is defined between the supporting portion and the second mounting member, the battery is disposed in the third receiving groove.

12. The packaging box of claim 11, wherein the fixing member comprises a first fixing portion and a second fixing portion connected to the first fixing portion, the second fixing portion defines a first slot and a second slot, the first slot passes through the second fixing portion along the first direction, the connecting member is movably disposed in the first slot;

the second fixing portion comprises a first side surface and a second side surface on both sides of the first slot, the second side surface is disposed between the first side surface and the first fixing portion, the first side surface is recessed along the first direction to form the second slot, the second slot communicates with the first slot, along the first direction, a depth of the second slot is greater than a thickness of the connecting member.

13. The packaging box of claim 11, wherein the anti-counterfeiting member further comprises a circuit board between the electronic screen and the battery, a portion of the circuit board protrudes from the electronic screen towards the second mounting member;

the second mounting member comprises a first sidewall facing the electronic screen and a second sidewall opposite to the first sidewall, the first sidewall is recessed towards the second sidewall to form a fourth receiving groove communicating with the third receiving groove, the portion of the circuit board is disposed in the fourth receiving groove.

14. The packaging box of claim 13, wherein the second mounting member comprises a limiting portion disposed in the fourth receiving groove, and the limiting portion is configured to limit a movement of the battery along the first direction.

15. The packaging box of claim 14, wherein the anti-counterfeiting member further comprises a switch, the switch and the electronic screen are disposed on a same surface of the circuit board;

the limiting portion comprises a first limiting plate and a second limiting plate extending from two opposite walls of the fourth receiving groove, adjacent ends of the first limiting plate and the second limiting plate define a fifth receiving groove for receiving the switch.

16. The packaging box of claim 10, wherein the anti-counterfeiting structure further comprises a cover, the cover covers the connecting member and is fixed to the first mounting member.

17. The packaging box of claim 10, wherein the second mounting member further comprises a first buckle and a second buckle, the connecting member comprises a third buckle and a fourth buckle, the third buckle and the fourth buckle are disposed at a bottom surface of the first receiving groove, the third buckle and the first buckle are configured to be snapped together, and the fourth buckle and the second buckle are configured to be snapped together.

18. The packaging box of claim 17, wherein the connecting member further defines a first through hole and a second through hole passing through the bottom surface of the first receiving groove, a position of the first through hole corresponds to a snap-together position of the first buckle and the third buckle, and a position of the second through hole corresponds to a snap-together position of the second buckle and the fourth buckle.

* * * * *